United States Patent
Heilman, III

[11] Patent Number: 6,066,811
[45] Date of Patent: *May 23, 2000

[54] WRITING DEVICE FOR USE WITH A PEN-BASED DATA INPUT SYSTEM

[76] Inventor: Paul M. Heilman, III, 1240 Rhus St., San Mateo, Calif. 94402

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,960

[22] Filed: Mar. 25, 1997

[51] Int. Cl.[7] .................................................. G08C 21/00
[52] U.S. Cl. ..................................... 178/18.01; 178/19.01; 178/19.03; 178/19.04; 178/19.05
[58] Field of Search ..................................... 345/179, 181, 345/184; 178/18.01, 18.03, 19.01, 19.03, 19.04, 19.05

[56] References Cited

U.S. PATENT DOCUMENTS

| | | | |
|---|---|---|---|
| 4,052,887 | 10/1977 | Sheridan et al. | 73/67.8 |
| 5,134,689 | 7/1992 | Murakami | 178/19 |
| 5,549,394 | 8/1996 | Nowak | 384/282 |
| 5,627,348 | 5/1997 | Berkson et al. | 345/179 |

*Primary Examiner*—Vijay Shankar
*Attorney, Agent, or Firm*—Thomason, Moser and Patterson

[57] ABSTRACT

An improved writing device containing a stylus comprised of a self-lubricating material such as lignum vitae. Lignum vitae is a natural, wood product containing a waxy substance that reduces friction at the tip of the stylus as the tip is moved over a surface. A writing device having a stylus fabricated of lignum vitae is substantially less prone to scratch, mar or otherwise damage the surface of a pen-based data input instrument.

7 Claims, 1 Drawing Sheet

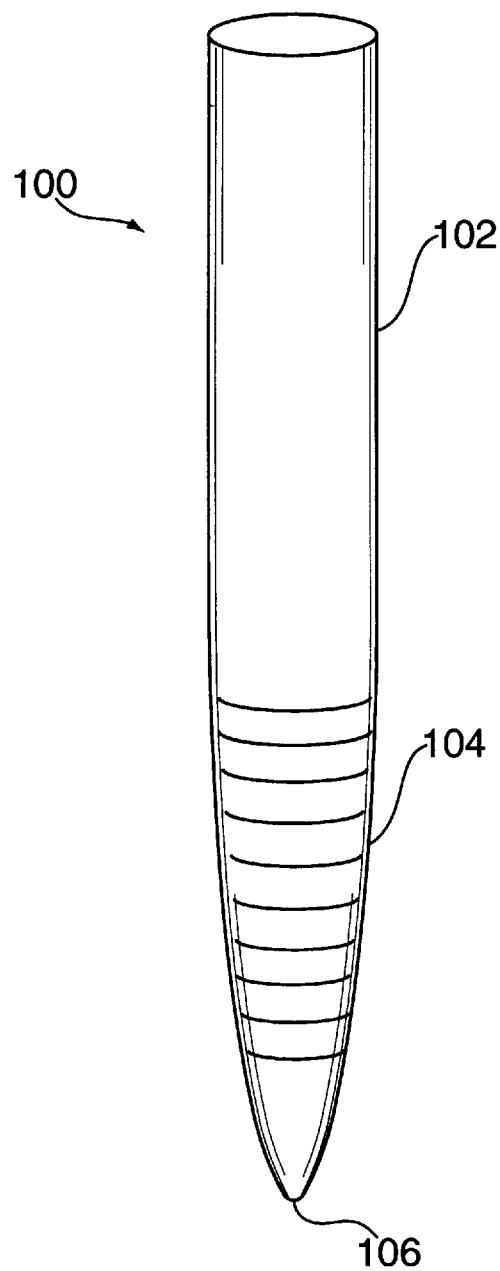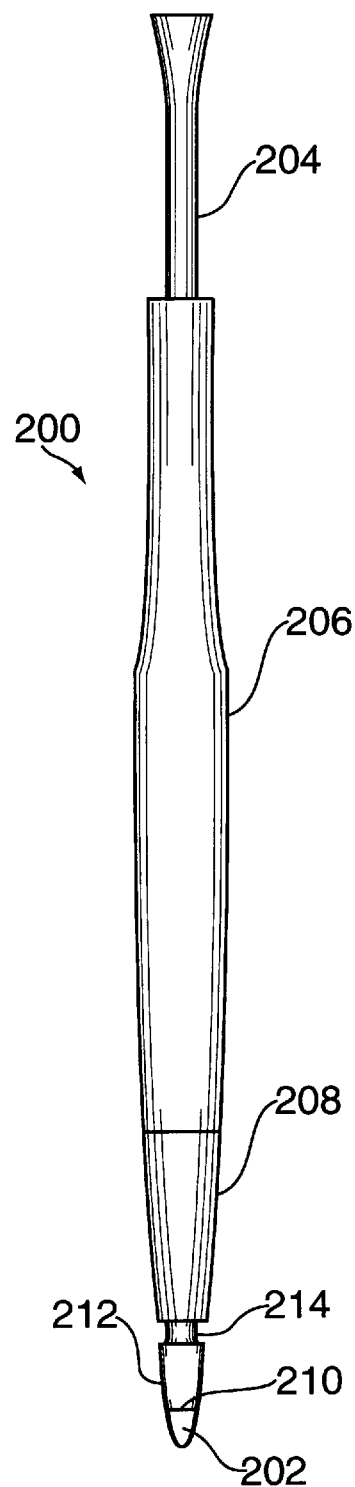
FIG. 1
FIG. 2

WRITING DEVICE FOR USE WITH A PEN-BASED DATA INPUT SYSTEM

BACKGROUND OF THE DISCLOSURE

1. Field of the Invention

The invention relates to pen-based data input systems and, more particularly, to an improved writing device for data entry into a pen-based data input system.

2. Description of the Background Art

A personal digital assistant (PDA) typically utilizes a writing "pen" for entering data using a so-called pressure sensitive liquid crystal display (LCD) screen. Generally, the LCD has a transparent pressure sensitive overlay that is used to detect the position of a pen stylus relative to the screen, e.g., using a piezo-electric or resistive technique. The screen typically has a deformable plastic faceplate against which a stylus tip of the pen is pressed to "write" on the screen. As the stylus position is detected, the PDA illuminates a pixel or pixels on the underlying LCD. Consequently, as the stylus is moved, an image appears on the LCD which tracks the stylus position.

A microprocessor stores the image in memory as a bit map, or otherwise processes the image, e.g., character recognition. Besides PDA's, this form of data input device is also used by graphic artists in so-called drafting/drawing tablets.

The pen typically contains a body which is grasped by the user and a Teflon® stylus (or tip) that impacts the screen. Teflon® is a registered trademark of E. I. DuPont de Nemours, Co. The stylus is typically made of Teflon® to promote a smooth writing action and to reduce friction as well as damage to the screen.

However, those skilled in the art have recognized that the Teflon® stylus does, over time, scratch, mar and otherwise degrade the screen. In fact, after heavy use, the screen may be degraded to a point where it becomes useless. To combat such degradation, disposable plastic overlays have become available to protect the screen. However, such overlays degrade the position detection accuracy.

Therefore, there is a need in the art for an improved writing device for entering information into a pen-based input system used in a PDA or drafting/drawing tablet.

SUMMARY OF THE INVENTION

The disadvantages associated with the prior art are overcome by the present invention of an improved writing device for a pen-based data input system (input screen) such as those used in personal digital assistants (PDAS) or drawing/drafting tablets. Specifically, the present invention contains a stylus comprised of a self-lubricating material such as lignum vitae. Lignum vitae is a natural, hardwood product containing a "waxy" substance that reduces friction at the stylus tip as the tip is moved over a surface. A writing device having a stylus fabricated of lignum vitae is substantially less prone to scratch, mar or otherwise damage the surface of the input screen. As such, the input screen lasts for a substantially longer duration than has been experienced using the prior art pens. Furthermore, a writing device having a lignum vitae stylus moves over the surface of the input screen in a more fluid fashion than a Teflon® stylus. The self-lubricating nature of lignum vitae reduces the friction between the stylus and screen and thus improves the writing quality of the user as well as increasing the detectablity of the handwriting.

BRIEF DESCRIPTION OF THE DRAWINGS

The teachings of the present invention can be readily understood by considering the following detailed description in conjunction with the accompanying drawings, in which:

FIG. 1 depicts an improved writing device carved from a cylinder of self-lubricating material; and FIG. 2 depicts a conventional PDA writing instrument fitted with an inventive stylus.

To facilitate understanding, identical reference numerals have been used, where possible, to designate identical elements that are common to the figures.

DETAILED DESCRIPTION

FIG. 1 depicts an improved writing device 100 that is useful for entering information into a pen-based data input system (input screen) such as is used in a personal digital assistant (PDA), a drafting/drawing tablet or other flat screen, pen-based data entry instrument. The writing device 100 contains a cylindrical body 102, a tapered section 104 and a rounded stylus tip 106. The writing device 100 is fabricated from a self-lubricating material such as lignum vitae. Lignum vitae is a natural, hardwood that contains a waxy substance that reduces friction between the tip and the input screen surface when the tip 106 is in contact and moved across the surface. As the tip moves, the self-lubricating feature of the lignum vitae promotes smooth motion of the tip of the writing device 100 over the input screen.

The first embodiment of writing device 100 depicted in FIG. 1 is a unitary cylinder of lignum vitae that has been carved or lathed to have the tapered section 104 connecting the body 102 to the rounded tip 106. The rounded tip 106 is sanded or otherwise formed into a rounded point. As such, the cylindrical body 102 of the writing device 100 can be grasped as a pencil or pen would be grasped and data entered into a PDA or other instrument in a natural writing manner.

FIG. 2 depicts a conventional pen-based device 200 having been fitted with an inventive self-lubricating stylus 202. This basic form of writing device is available from Apple Computer of Cupertino, Calif. as an input device for the Newton® message pad. Significant features of this pen construction are the "spring loaded" extension 204, the hollow barrel 206 and the metallic tapered region 208. The extension 204 interfits a bore in the hollow barrel and "locks" therein to reduce the length of the pen while stored. The metallic tapered region 208 contains a detent 214 which interfits within a bore in the Newton® message pad (not shown) to conveniently retain the pen within the casing of the Newton® message pad. Fitted to the end of the tapered region 208 is a stylus 202. The stylus 202 is fabricated from a self-lubricating material such as lignum vitae. The stylus 202 is generally conical having a flat portion 210 that is adhered to a flat end 212 of the tapered region 208. The stylus 202 is adhered to the tapered region 208 using an adhesive. Alternatively, other techniques for attaching the stylus to the pen body are available, such as a threaded, wood screw-like extension from the surface 212 onto which the stylus 202 can be threaded. Also, a dowel extension can be provided on the stylus to interfit a bore in the flat portion 212 of the tapered portion 208. Many other variants of attachment technique for attaching the stylus to the body of the pen are available and well within the understanding of those skilled in the art.

Although various embodiments which incorporate the teachings of the present invention have been shown and described in detail herein, those skilled in the art can readily devise many other varied embodiments that still incorporate these teachings.

What is claimed is:

1. An improved writing device for a pen-based data input system comprising a stylus having a fixed conical, substantially pointed tip fabricated of a self-lubricating material, wherein said self-lubricating material reduces sliding friction between said substantially pointed tip and a surface of said pen-based data input system.

2. The writing device of claim 1 wherein said self-lubricating material is lignum vitae.

3. The writing device of claim 1 further comprising a unitary cylindrical body carved so that a tapered section connects a stylus tip to the cylindrical body.

4. A writing device for a pen-based data input system comprising:

a pen body; and a stylus, having a fixed conical, substantially pointed tip fabricated of a self-lubricating material, connected to the pen body, wherein said self-lubricating material reduces sliding friction between said substantially pointed tip and a surface of said pen-based data input system.

5. The writing device of claim 4 wherein said self-lubricating material is lignum vitae.

6. The writing device of claim 4 wherein the pen body contains a tapered region and a barrel portion.

7. The writing device of claim 4 wherein the stylus is connected to the pen body using an adhesive.

* * * * *